United States Patent [19]

Richter et al.

[11] 4,394,267

[45] Jul. 19, 1983

[54] DIFFUSER ASSEMBLY

[75] Inventors: Johan C. F. C. Richter, Oslo, Norway; Ole J. Richter, Karlstad, Sweden

[73] Assignee: Kamyr, Inc., Glens Falls, N.Y.

[21] Appl. No.: 397,407

[22] Filed: Jul. 12, 1982

[51] Int. Cl.³ .......................................... B01D 33/00
[52] U.S. Cl. .................................. 210/331; 210/332; 210/412
[58] Field of Search ............... 210/331, 332, 338, 343, 210/345, 347, 407, 409, 412, 232; 162/251, 380, 242; 68/181 R

[56] References Cited

U.S. PATENT DOCUMENTS 3,524,551  8/1970  Richter .......................... 68/181 R
3,579,420  5/1971  Richter .
3,594,269  7/1971  Clark .
4,276,167  6/1981  Richter et al. .

Primary Examiner—Frank Sever
Attorney, Agent, or Firm—Cushman, Darby & Cushman

[57] ABSTRACT

A simplified diffusion washer or the like is provided. Withdrawal screens and fluid introducing structures are mounted by support arms and a central conduit. The central conduit, with attached screens and the like, is reciprocated up and down by a single linear actuator located below the vessel. Withdrawn liquid is taken out the bottom of the vessel, while treatment liquid is introduced through the top or bottom.

12 Claims, 2 Drawing Figures

DIFFUSER ASSEMBLY

BACKGROUND AND SUMMARY OF THE INVENTION

In U.S. Pat. No. 4,276,167, a simplified and efficient structure for effecting diffusion washing, bleaching, and/or thickening or the like has been illustrated and described, and the entire disclosure of said patent is hereby incorporated by reference herein. While the structure as illustrated in said patent has numerous advantages over conventional diffusion washers, and the like, there may be a few minor drawbacks associated therewith, especially for large production vessels.

The structure in U.S. Pat. No. 4,276,167 includes the linear actuator for reciprocating the withdrawal screens, and fluid introduction structures, located at the top of the vessel, with all wash liquid and withdrawal conduits also located at the top. For large production vessels with large and heavy screen structures, the supporting frame for supporting the actuator on the top is inconveniently large and heavy. Further, at start-up one must suck up the liquor being withdrawn, and since the temperature in the vessel is in the range of 70°–100° C., there may be boiling problems.

According to the present invention an improvement over the structure illustrated in U.S. Pat. No. 4,276,167 is provided, which improvement is especially useful for situations where the vessel is a large production vessel. According to the present invention, the linear actuator for reciprocating screens and fluid introducing structures is located at the bottom of the vessel, and the extracted liquor is also withdrawn through the bottom of the vessel. Thus, there is no necessity for a large and cumbersome supporting structure for the linear actuator at the top of the vessel, the withdrawn liquid can be easily passed out the bottom without boiling problems, and the liquid conduit structures in generally can be simpler since the treatment liquor (wash or bleaching) is introduced at either the top or the bottom while the withdrawn liquid is taken out through the bottom.

While the structure according to the invention overcomes potential problems associated with the structure in U.S. Pat. No. 4,276,167, it does so without sacrificing most of the advantages thereof. Although it is necessary to provide a penetration at the bottom wall of the vessel in order to provide liquid withdrawal through the bottom, since the central structure is not rotating, but merely reciprocal, this can be accomplished by a simple packing box, there being no necessity for additional packing boxes, seals, or the like in order to effect a desired action. Thus the packings for the central rotor and for packing and sealing the arm where they extend through the vessel side walls which were inherent in the art prior to the invention in U.S. Pat. No. 4,276,167, still are avoided according to the present invention. A distinct, central rotor can be mounted at the top of the vessel to remove treated pulp.

It is the primary object of the present invention to provide a simple and efficient structure for the washing, bleaching, and/or thickening of pulp or the like. This and other objects of the invention will become clear from an inspection of the detailed description of the invention, and from the appended claims.

DETAILED DESCRIPTION OF THE DRAWING

Figure 1:
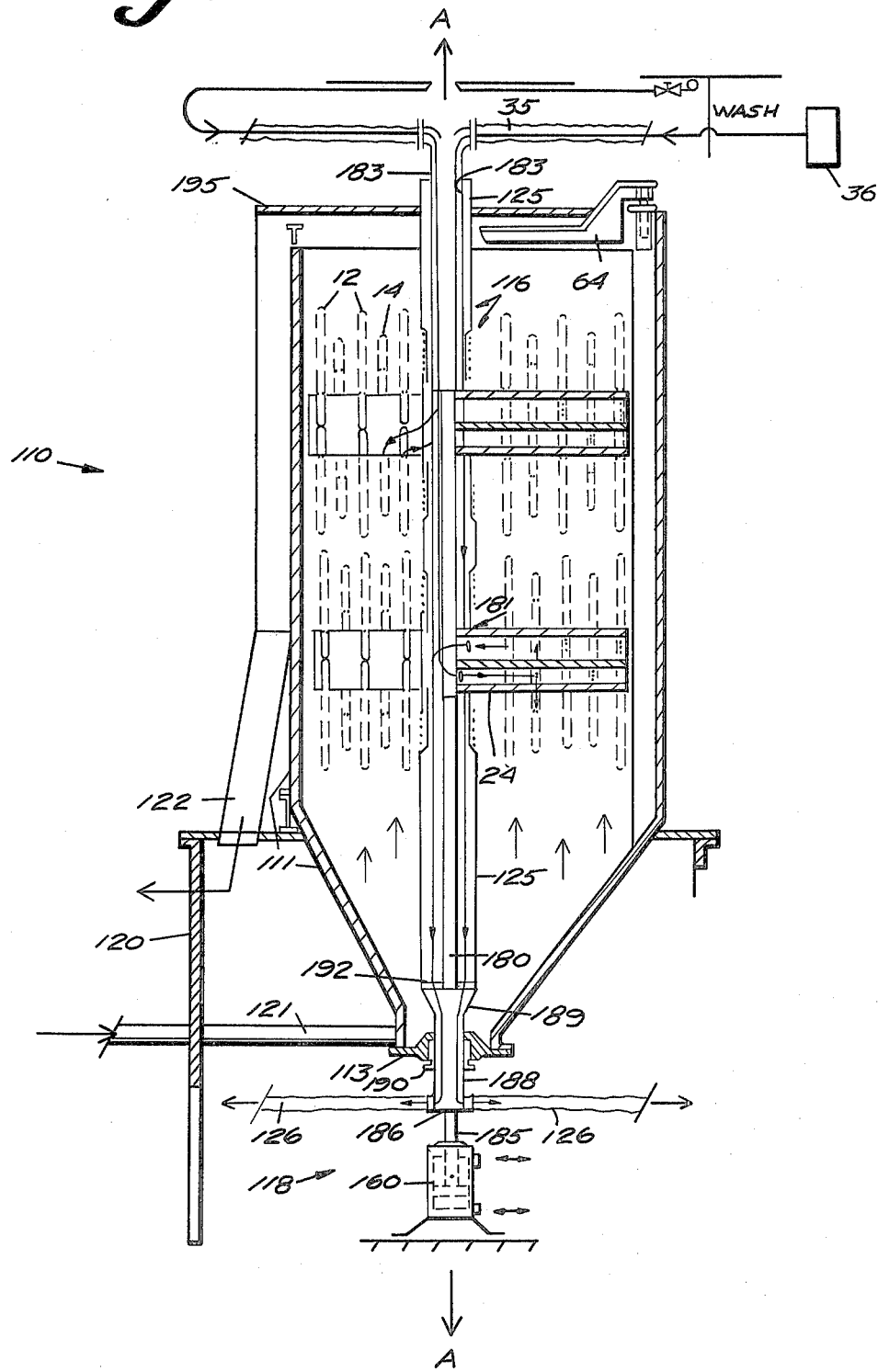
FIG. 1 is a cross-sectional schematic view exemplary apparatus according to the present invention, showing some components in elevation.

The entire disclosure of U.S. Pat. No. 4,276,167 is hereby incorporated by reference herein, and attention is directed thereto for detailed description of the component parts of the apparatus according to the invention. The reference numerals in FIGS. 1 and 2 of the drawings correspond to reference numerals utilized in the disclosure in said U.S. Pat. No. 4,276,167. For structures illustrated in FIG. 1 specific to the present invention and/or which differ slightly from the corresponding structures in the U.S. Pat. No. 4,276,167, the reference numerals are preceded by a "1", and for structures specific to the embodiment of FIG. 2 but like those of the patent, or FIG. 1, the reference numerals are preceded by a "2".

The vessel 110 in FIG. 1 includes side walls 111 and a bottom wall 113. The basic apparatus and vessel include a plurality of withdrawal screens 12, a plurality of fluid introducing structures 14, conduit means 116, and means 118 for reciprocating the conduit means back and forth in the direction of elongation A—A of the vessel 110. The vessel 110 is preferably mounted on its own solid base, indicated scematically by reference numeral 120.

Pulp or like fluent material to be treated passes through conduit 121 through a side wall 111 of vessel 110, adjacent the bottom 113, and flows upwardly in the vessel 110, indicated by the arrows in FIG. 1. Withdrawn, treated pulp passes out of outlet 122, and then may pass to a brown stock, or like subsequent treatment or storage station.

The conduit means 116 take the form of a plurality of arms 24 extending outwardly from a central tubular or rectangular conduit 125. Disposed concentric with the conduit 125 is a central rod 180 which is operatively connected to the reciprocating means 118. Also, the arms 24 are connected to rod 180, as indicated generally by reference numeral 181, passing through the central conduit 125 and in communication with the interior of the conduit 125.

Treatment liquid may be introduced at the top, flexible conduits 35 interconnecting a wash or bleach liquid source 36, through a conduit 125, to conduits 183 interior of the central conduit 125, and which pass to the appropriate sections of arms 24 to communicate with the fluid introducing structures 14. Withdrawal is provided through the bottom 113 of the vessel, the entire interior of central conduit 125 (except for that filled up by the treatment liquid introducing conduits 183 and the central rod 180) providing for communication with the flexible withdrawal conduits 126 located exteriorly of the bottom 113 of vessel 110.

The reciprocating means 118 consists of a single linear actuator 160, preferably a hydraulic cylinder assembly or the like. The hydraulic cylinder assembly includes a piston rod 185 which is operatively connected to a bottom plate 186 of central conduit 125. The conduit 125 includes a first portion, interior of the vessel 110, and a bottom portion 188, connected by a tapering transition piece 189 to the rest of the conduit, which passes through a single central packing box 190 in the bottom wall 119. The central rod 180 may be connected, as by spider means 192, just above the transition piece 195 to the central conduit 125, the central rod 180 not passing past the spider means 182 (i.e., not extending into the smaller diameter second portion 188, or the transition 189).

At the top of the vessel 110, in order to effect withdrawal of treated pulp of the like, a plurality of distinct wiper blades 44 are provided, each wiper blade 64 elongated in the direction perpendicular to the direction of elongation A—A of the vessel 110. Means are provided for pivotally oscillating each of the blades 64 about an axis parallel to the direction elongation A—A of the vessel, and distinct from the pivotal axis of others of the plurality of wiper blades 64. A cover 195 may be provided on the top of vessel 110. The cover is apertured so as not to interfere with the pivoting of blades 64.

Figure 2:
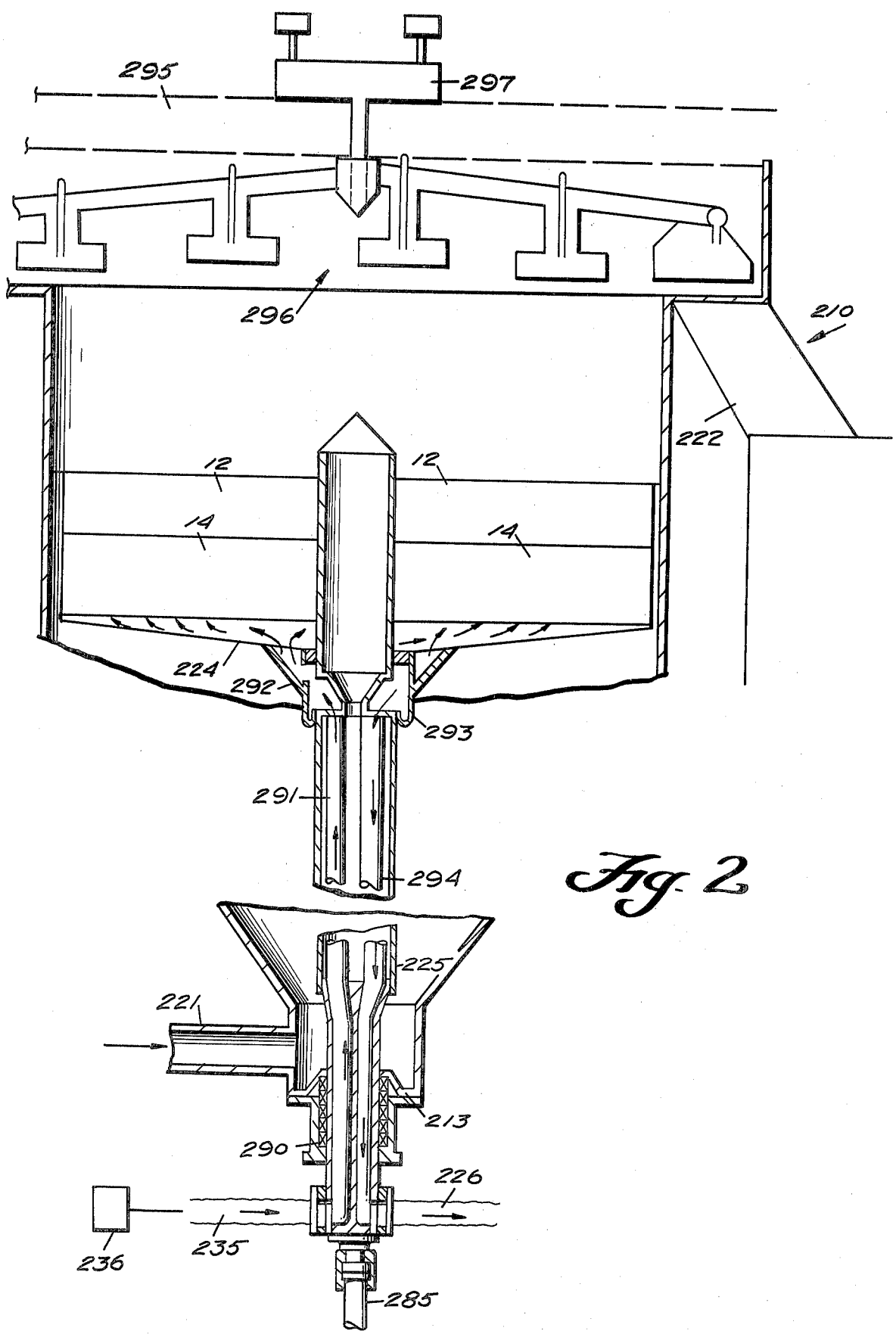
FIG. 2 is a cross-sectional partial schematic view of another embodiment of exemplary apparatus according to the present invention.

In the embodiment of FIG. 2, the treatment fluid is introduced at the bottom of the vessel 210, as well as the withdrawn fluid being pulled out through the bottom. This is readily accomplished by providing—instead of two flexible withdrawal conduits 126 as illustrated in FIG. 1—a flexible fluid introducing conduit 235 (introducing treatment fluid from wash or bleaching liquid, or the like, source 236) at one end of central conduit 225, with the withdrawal conduit 226 at the opposite side thereof. The shaft 285 is connected to a hydraulic cylinder assembly such as assembly 160 in FIG. 1.

In this embodiment, the extension 291 of fluid inlet conduit 235, which passes through packing box 290, passes through gussets 292 to the bottom of headers 224 to be introduced between the screen elements 12, which are shown as linear screen elements, withdrawal from the screen elements being provided through a second arrangement of headers (not shown) parallel to the headers 224, to pass through the main support 293 for each set of screen assemblies to the pipe 294 interior of the central tubular conduit 225, and ultimate to the flexible withdrawal liquid hose 226.

In the FIG. 2 embodiment, also, since there are no introducing structures at the top, a central rotating scraper 296 is illustrated for removing the treated fluent material. The scraper 296 is conventional, except that it is not in any way associated with the interior screen assemblies or the like, but rather is mounted separately, and on a top 295 for the vessel 210, being rotated by apparatus 297 to discharge the treated fluent material through withdrawal conduits 222 or the like to a storage vessel, or the like, as is conventional.

In both embodiments, the hydraulic cylinder assembly 160 or the like has a reciprocating stroke of about 10 inches, a complete cycle of reciprocation taking place (i.e., the rod 285 being pulled quickly downwardly) about once a minute.

Of course the screens 12 and fluid introducing structures 14 can take the linear, square, or annular forms such as illustrated in U.S. Pat. No. 4,276,167.

It will thus be seen that according to the present invention a simple and effective apparatus has been provided for the diffusion washing, bleaching, and/or thickening of pulp or the like.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and combinations.

What is claimed is:

1. In an elongated upright hollow vessel which includes side and bottom walls, the improvement comprising: a plurality of withdrawal screens extending substantially parallel to the vessel direction of elongation, and spaced from each other in directions perpendicular to the vessel direction of elongation; non-rotatable conduit means for supporting said withdrawal screens and for providing for passage of fluid from said withdrawal screens to an area remote from said withdrawal screens and exterior of said vessel; means for only reciprocating said conduit means with attach withdrawal screens up and down in a direction substantially coincident with the direction of elongation of the vessel; and means for introducing fluent material to be treated into said vessel and withdrawing treated fluent material therefrom; and said means for only reciprocating consisting essentially of a linear actuator located below the bottom wall of said vessel within the cross-sectional area of the vessel, for avoiding boiling problems as a result of liquor suck-up during start-up; and wherein said conduit means for providing passage of fluid from said withdrawal screens includes a central conduit substantially concentric with said linear actuator and reciprocal with said linear actuator, said central conduit operatively passing through the bottom wall of said vessel.

2. A combination as recited in claim 1 wherein said linear actuator comprises a hydraulic cylinder.

3. A combination as recited in claim 1 wherein said means for introducing fluent material into said vessel comprises means for introducing fluent materials through a side wall of said vessel, adjacent said bottom wall thereof and spaced from said conduit for passage of fluid from said withdrawal screens.

4. A combination as recited in claim 1 further comprising at least one flexible pipe mounted to said conduit exterior of said vessel.

5. A combination as recited in claim 1 further comprising a plurality of fluid introducing structures, and wherein said conduit means comprises means for supporting said fluid introducing structures so that they are interspersed with and stationary with respect to said withdrawal screens and for providing passage of fluid from an area remote from said fluid introducing structures to said fluid introducing structures.

6. A combination as recited in claim 5 wherein said means for providing passage of fluid to said fluid introducing structures comprises at least one flexible fluid introducing pipe mounted above said vessel.

7. A combination as recited in claim 5 wherein said means for providing passage of fluid to said fluid introducing structures comprises at least one flexible fluid introducing pipe mounted below said vessel, and in operative communication with said central conduit.

8. A combination as recited in claim 1 further comprising a rod disposed centrally of said central conduit for withdrawing fluid from said withdrawal screens, said rod operatively attached to said linear actuator and said central conduit, and wherein said conduit means for supporting said withdrawal screens further comprises a plurality of extending arms, said arms mounted directly to said central rod and opening into said central conduit adjacent said rod.

9. A combination as recited in claim 8 wherein said central rod is connected to said central conduit by said arms, and by a spider mounted adjacent the bottom of said central conduit; said central conduit tapering to a smaller diameter, than said first section, below said spider, passing through said vessel bottom wall with said smaller diameter, said central rod not extending into said second diameter portion.

10. A combination as recited in claim 1 further comprising means for distributing treated fluent material from the interior of the vessel at the top thereof into surrounding withdrawal conduits; said distributing means consisting essentially of a plurality of distinct wiper blades elongated in the direction perpendicular to the direction of elongation of the vessel, and means for pivotally oscillating each said wiper blade about an axis parallel to the direction of elongation of the vessel, and distinct from the pivot axis of others of said plurality of wiper blades.

11. A combination as recited in claim 1 further comprising a central rotatable scraper mounted above said vessel for distributing treated fluent material from the interior of the vessel at the top thereof into surrounding withdrawal conduits, said central rotatable scraper being completely independent of the withdrawal screens, reciprocating means, and central tubular conduit.

12. A combination as recited in claim 11 further comprising a plurality of fluid introducing structures, and wherein said conduit means comprises means for supporting said fluid introducing structures so that they are interpersed with and stationary with respect to said withdrawal screens and for providing passage of fluid from an area remote from said fluid introducing structures to said fluid introducing structures; and wherein said means for providing passage of fluid to said fluid introducing structures comprises at least one flexible fluid introducing pipe mounted below said vessel, and in operative communication with said central tubular conduit.

* * * * *